United States Patent [19]

Douglas, Jr.

[11] Patent Number: 4,888,904
[45] Date of Patent: Dec. 26, 1989

[54] FISHING LURE WITH LCD BAIT

[76] Inventor: Johnny H. Douglas, Jr., P.O. Box 1724, Syracuse, N.Y. 13201

[21] Appl. No.: 180,136

[22] Filed: Apr. 11, 1988

[51] Int. Cl.$^4$ ............................................. A01K 75/02
[52] U.S. Cl. ..................................................... 43/17.6
[58] Field of Search ...................... 43/17.1, 17.5, 17.6, 43/42.09, 42.32, 42.33, 42.35, 42.36

[56] References Cited

U.S. PATENT DOCUMENTS

| | | | |
|---|---|---|---|
| 515,001 | 2/1894 | Lamb | 43/42.32 |
| 581,768 | 5/1897 | Quinn | 43/42.32 |
| 2,764,834 | 10/1956 | Klein | 43/42.33 |
| 2,864,195 | 12/1958 | Bachmann | 43/17.5 |
| 2,904,922 | 9/1959 | Orebaugh | 43/42.32 |
| 3,210,882 | 10/1965 | Purdom | 43/42.33 |
| 3,336,692 | 8/1967 | Knight | 43/42.33 |
| 4,787,167 | 11/1988 | Wroclawski | 43/42.33 |
| 4,803,793 | 2/1989 | Schellenberg, III | 43/42.33 |

FOREIGN PATENT DOCUMENTS 1528841  5/1968  France ............................. 43/42.33

Primary Examiner—M Jordan
Attorney, Agent, or Firm—Charles S. McGuire

[57] ABSTRACT

A fishing lure including a transparent body enclosing a programmable liquid crystal display device is disclosed. An integrated surface chip powered by a small battery drives the display and may be selectively actuated to produce images simulating various forms of natural fish baits, such as minnows, worms, crickets and other insects, or crayfish, any one of which may be selectively displayed, at the option of the user. The system may also be programmed to cause portions of the display to alternate in position, thereby creating an illusion of motion. Program controls and battery are housed within the body and are accessible through an opening normally closed by a removable plug. A fish hook is secured in position on the body in cooperative relation to the liquid cyrstal display.

13 Claims, 1 Drawing Sheet

FISHING LURE WITH LCD BAIT

BACKGROUND OF THE INVENTION

The present invention relates to fishing lures and, more particularly, to lures incorporating electronic means for generating a visual display simulating a natural fish bait.

Fishing lures have been provided in the past with means for selectively changing a visual display of a natural bait, such as a minnow, or a color or pattern calculated to attract fish and cause them to strike at the lure. Such devices are found, for example, in U.S. Pat. Nos. 2,764,834, 3,210,882 and 3,336,692, each having means for holding and moving a film strip to expose a selected frame or portion thereof through a transparent section of the lure body. The image on the film, of course, is stationary and provides no illusion of motion.

A popular means of providing displays of alphanumeric characters, as well as other two-dimensional images of both fixed and variable types is that known as a liquid crystal display. Commercially available reflective type liquid crystal displays generally comprise top and bottom glass plates with a liquid crystal material sandwiched therebetween. An electrical field may be applied to selected segments of the liquid crystal material to change the light-transmissive properties thereof to produce, in cooperation with ligh polarizing layers, the desired image or visual display. By alternating the portions of the liquid crystal material to which the electrical field is applied the display may be varied, and an illusion of motion may be created.

It is a principal object of the present invention to provide a fishing lure of novel and improved design incorporating a liquid crystal display to simulate a natural bait.

A further object is to provide a fishing lure wherein any of a plurality of visual displays of different natural fish baits may be selectively provided.

Another object is to provide a fishing lure including means displaying a visual image of a natural fish bait which appears to be moving.

A still further object is to provide a fishing lure having a body portion incorporating a liquid crystal display of a natural fish bait with a fish hook retained in a position on the body in cooperative relation to the visual display.

Other objects will in part be obvious and will in part appear hereinafter.

SUMMARY OF THE INVENTION

In accordance with the foregoing objects, the invention contemplates a fishing lure comprising a body at least a portion of which is transparent. A liquid crystal device is either permanently or removably housed within the body portion with the visual display viewable through the body. The nature of the display is controlled by an appropriate integrated circuit chip connected between a battery and the liquid crystal device. A threaded plug or other removable covering is positioned in an opening in the body through which the battery is accessible for replacement. The integrated circuit chip and liquid crystal device may also be removable through the opening, if desired.

In a preferred embodiment, the image displayed on the LCD may be actuated, i.e., turned on and off, as well as selectively changed to simulate any of a plurality of natural baits, such as crickets, flies, or other insects, worms, crayfish, etc. The circuit may also be appropriately programmed to display the various baits in different sizes and may be sequentially varied to display the bait, or portions thereof, in different positions to create an illusion of motion.

A fish hook is positioned on the lure body in cooperative relation to the visual display, whereby a fish biting or striking at the visual display of the bait will be caught on the hook. The preferred hook retention means comprises a block or plug of resilient material which is force-fitted in an opening in the lure body. The resilient material may also be porous or absorbent to carry a liquid scent or other fish attractant, if desired. The hook and/or resilient material is connected to the fishing line or leader separately from the lure so that the hook, and a fish caught thereon, are not lost if the hook becomes separated from the lure body.

The foregoing and other features of construction and operation of the fishing lure of the invention will be more fully understood and appreciated from the accompanying drawing and related detailed description.

DETAILED DESCRIPTION

Figure 1:
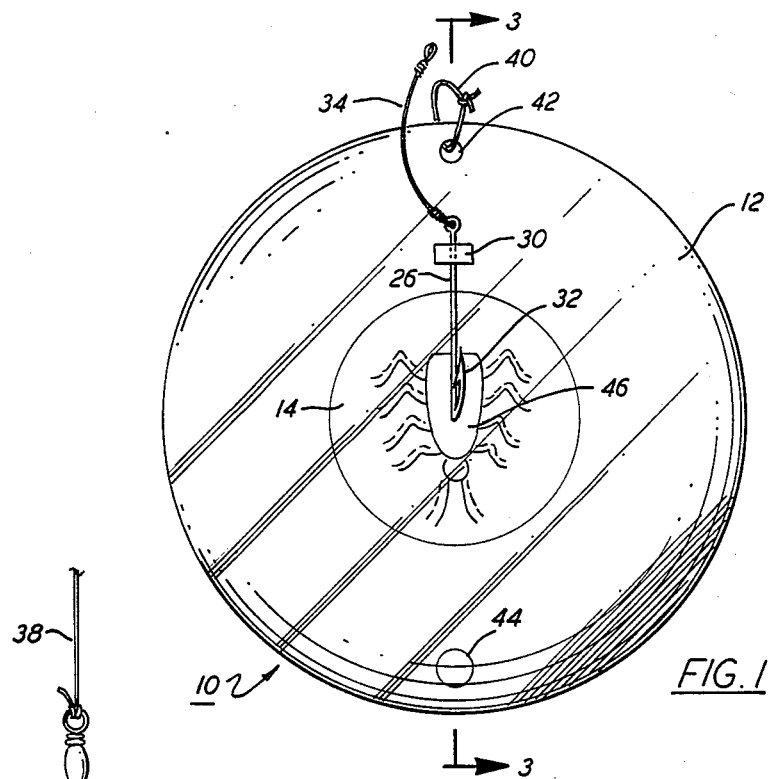
FIG. 1 is a front elevational view of the lure, including the hook and associated terminal tackle.
Figure 3:
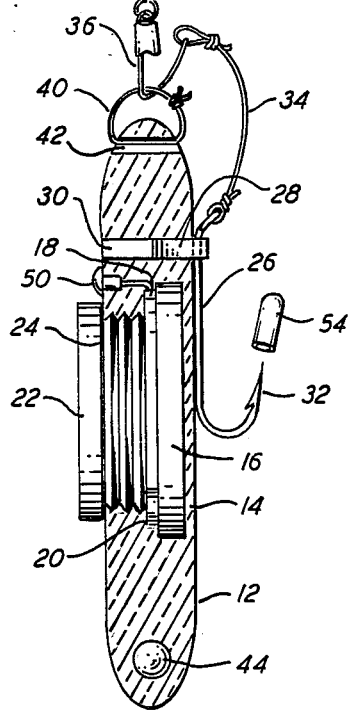
FIG. 3 is a side elevational view, in section on the line 3—3 of FIG. 1.

Referring now to the drawing, the lure of the invention is denoted generally by reference numeral 10 and includes body portion 12, of disk-like form in the illustrated embodiment. Body 12 is transparent, at least in central portion 14, and may be formed entirely of a transparent material such as a cast acrylic. A liquid crystal display (LCD) is incorporated in known manner in LCD device 16 which is either permanently or removably mounted in body 12 so that the LCD is visible through central body portion 14. Integrated circuit chip 18 and minature battery 20 are mounted in an appropriately configured cavity in body 12, accessible through a threaded opening. Plug 22 is removably threaded into the opening and is maintained in water-tight engagement with body 12 by gasket 24.

Fish hook 26 is fixedly attached to resilient block 28 of rubber, or other such material, having an uncompressed cross-sectional area somewhat larger than that of opening 30 in body 12. Block 28 is forcibly inserted into opening 30, and is frictionally retained therein to position hook 26 in the desired orientation with barbed end portion 32 thereof in front of and outwardly disposed with respect to central body portion 14 and thus to the visual image of the LCD. Block 28 and hook 26 are tethered by short line 34 to clip 36 which is tied or otherwise secured to the end of fishing line or leader 38. Body 12 is also secured to clip 36 by loop 40 which passes through both clip 36 and opening 42 in body 12. Lead weight 44 may be attached or permanently molded into body 12, if desired, to maintain lure 10 in the proper orientation in the water.

Chip 18, powered by battery 20, provides electrical signals to device 16 in known manner to cause the LCD to display a visual image. Chip 18 is appropriately programmed, also in known manner, to cause the image created on the LCD to simulate the appearance of a natural fish bait, such as cricket 46, shown in FIG. 1.

Preferably, chip 18 is of the type which alternates sequentially to cause the visual display to change between two or more images wherein the natural bait item is displayed in different positions, thereby creating an illusion of motion. For example, the legs and antenna of cricket 46 may be sequentially displayed in the positions shown in solid and dotted lines in FIG. 1 to create the illusion that the insect is alive and moving back and forth between the two positions displayed in the LCD.

Figure 2:
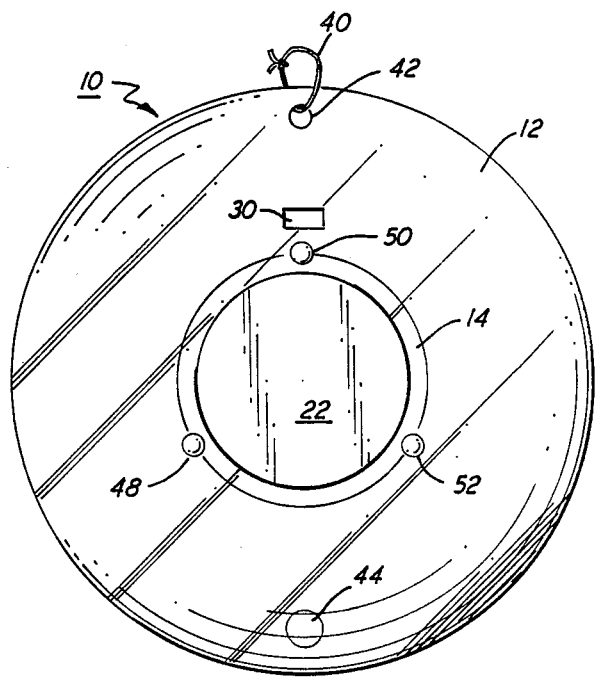
FIG. 2 is a rear elevation view.

In a further preferred refinement, chip 18 is of the type containing a plurality of programs which may be selectively actuated to produce any of several visual displays, each simulating a different natural bait. For this purpose, chip 18 is provided with or connected to a suitable, manually actuated, sequential switching device. A button, or other such manually engageable member, is positioned on or near chip 18 for access by the operator, either by removing plug 22 or from the outside of lure 10 by positioning directly upon the plug or other portion of body 12. In the arrangement shown in FIG. 2, for example, buttons 48, 50 and 52 are arranged on body 12 on the surface opposite that through which the LCD is visible, adjacent plug 22. The buttons are covered by a flexible, waterproof material to maintain the water-tight integrity of the interior of the lure.

Button 48 controls the on-off switch so that there is no drain on battery 20 when lure 10 is not in use. Button 50 may be depressed to actuate a switch controlling the active program on chip 18. That is, each sequential actuation of button 50 will cause the program fed to chip 18 to change, producing a visual image of a different natural bait, some or all of which may include the previously mentioned motion illusion feature. Button 52 is an optional feature, provided for the purpose of changing the active program in a manner producing a visual image of a different size which may be desireable in using the lure for different types or sizes of fish, or under different fishing conditions. For example, cricket 46 may be displayed in small, medium and large sizes by actuation of button 52.

From the foregoing it may be seen that the invention provides a novel lure effective both for attracting and for securely hooking and retriving fish. Lure body 12 is preferably of a size large enough to prevent a fish from swallowing the hook. This will normally render the use of a steel leader unnecessary and make it easier to remove the hook. Since the LDC will normally appear in black it may also be advantageous to use a black hook. Alternatively, the hook may be camouflaged by placing a small, black piece of foam rubber or other porous material 54 on barbed end 32; material 54 may also be saturated with a liquid scent or fish attractant of known type, or a small piece of real bait may be substituted. If resilient block 28 is disengaged from lure 10 after a fish is hooked as will often be the case, tension is transferred from the hook through short line 34, directly to fishing line 38 rather than to lure 10.

What is claimed is:

1. A fishing lure presenting in outline form a visual image of an insect, worm, or other form of live bait, said lure comprising:
   (a) a liquid crystal device having a plurality of segments independently actuable to render said segments visibly distinct;
   (b) an electrical power source adapted to actuate said segments when connected thereto;
   (c) programming means for connecting said power source to predetermined ones of said segments to produce said outline image of said live bait; and
   (d) a fish hook supported in predetermined relation to said image.

2. The fishing lure of claim 1 and further including control means for said programming means, causing said predetermined ones of said segments to vary between a first set and a second set of said segments, thereby varying said outline image.

3. The fishing lure of claim 2 wherein said first set of segments constitutes a bodily outline of said live bait in a first position of physical movement, and said second set of segments constitutes a bodily outline of the same live bait in a second position of physical movement.

4. The fishing lure of claim 3 wherein said control means is automatically variable to cause said predetermined ones of said segments to vary back and forth between said first and second sets, thereby creating an illusion of movement of said live bait between said first and second physical positions.

5. The fishing lure of claim 2 wherein said first set of segments constitutes a bodily outline of a first type of said live bait, and said second set of segments constitutes a bodily outline of a second type of said live bait.

6. The fishing lure of claim 5 wherein said control means is selectively operable to cause said predetermined ones of said segments to change between said first and second sets.

7. The fishing lure of claim 1 and further including a body portion having a cavity enclosing said liquid crystal device in waterproof engagement, said body portion being transparent in at least the area covering said outline image.

8. The fishing lure of claim 7 wherein said fish hook is supported immediately forwardly of said outline image.

9. The fishing lure of claim 8 and further including means for attaching said body portion to terminal fishing tackle, and means for attaching said fishing hook releasably to said body portion and fixedly to said terminal tackle.

10. A fishing lure having visual image of a natural bait, said lure comprising:
   (a) a body portion having an internal cavity accessible through an opening in said body portion;
   (b) a liquid crystal device adapted to generate a visual image in the form of a liquid crystal display visible on a surface of said device;
   (c) means for mounting said device within a first portion of said cavity with said surface fully covered by a predetermined area of said body portion;
   (d) said body portion being transparent at least in said predetermined area, whereby said surface of said device is visible through said body portion;
   (e) circuit means including a power source mounted in a second portion of said cavity and connected to said device to provide electrical signals driving said device to generate a visual image simulating the appearance of a natural fish bait;
   (f) closure means removably covering said opening; and
   (g) a fish hook and means for releasably attaching said fish hook to said body portion with the point of said hook forwardly adjacent said predetermined area, said releasable attaching means comprising a resilient member to which said hook is fixedly attached and means for frictionally engaging said resilient member with said body portion.

11. The fishing lure of claim 10 wherein said frictional engaging means comprise a bore extending into said body portion and having a cross-sectional area less than that of said resilient member, whereby the latter may be compressed and force fitted into said bore to frictionally engage the walls thereof.

12. The fishing lure of claim 11 wherein said body portion is attached to a fishing line and further including means for attaching said resilient member to said fishing line independently of the releasable attachment of said resilient member to said body portion.

13. The fishing lure of claim 12 wherein said closure means comprise a plug threadedly engaging said opening in said body portion.

* * * * *